(12) United States Patent
Ishikawa (10) Patent No.: US 7,644,886 B2
(45) Date of Patent: Jan. 12, 2010

(54) REEL

(75) Inventor: Ren Ishikawa, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 12/127,522

(22) Filed: May 27, 2008

(65) Prior Publication Data

US 2009/0050732 A1    Feb. 26, 2009

(30) Foreign Application Priority Data

Aug. 24, 2007    (JP) .............................. 2007-218869

(51) Int. Cl.
    *B65H 75/08*    (2006.01)
(52) U.S. Cl. .................. 242/613.4; 242/348; 242/610.5
(58) Field of Classification Search ................ 242/348, 242/348.2, 608, 608.8, 609, 609.4, 610, 610.4, 242/610.5, 610.6, 611, 613, 613.4
    See application file for complete search history.

(56) References Cited

U.S. PATENT DOCUMENTS 3,485,456 A * 12/1969 Tellen et al. ............. 242/608.4
3,485,457 A * 12/1969 Hultgren ................... 242/613.4
4,807,826 A *  2/1989 Iwahashi ..................... 242/608
7,168,655 B2 * 1/2007 Morita ..................... 242/610.4
7,300,016 B2 * 11/2007 Brown et al. ............. 242/613.4
7,347,397 B2 * 3/2008 Ishikawa et al. ......... 242/613.4
2003/0226924 A1* 12/2003 Morita ........................ 242/348
2003/0226931 A1* 12/2003 Morita ..................... 242/610.4

FOREIGN PATENT DOCUMENTS

JP    2005-116163 A    4/2005

* cited by examiner

*Primary Examiner*—William A Rivera
(74) *Attorney, Agent, or Firm*—Sughrue Mion, PLLC (57) ABSTRACT

The invention of the present application provides a reel, which can improve the dimensional accuracy of a hub, having a configuration in which a reinforcing tubular member is disposed on the hub by insert molding. A resin layer extends from one end portion side of the hub at which a first flange is integrally formed in a height direction of the hub. The resin layer is disposed on an inner peripheral surface of the tubular member in the reel. The reel is provided with a resin hub having an outer peripheral surface on which a recording tape T is wound, the first flange is integrally formed at one end portion of the hub, a second flange is welded at the other end portion of the hub, and a reinforcing tubular member is disposed on an inner peripheral surface of the hub by insert molding.

7 Claims, 10 Drawing Sheets

REEL

CROSS-REFERENCE TO RELATED APPLICATION

This application claims priority under 35 USC 119 from Japanese Patent Application No. 2007-218869 filed Aug. 24, 2007, the disclosures of which is incorporated by references herein.

BACKGROUND

1. Technical Field

The present invention relates to a reel on which a recording tape such as a magnetic tape, generally used as data recording/playback media of a computer, is wound.

2. Related Art

A recording tape cartridge in which a recording tape such as a magnetic tape, which is used as data recording/playback media (data backup) of a computer or the like, is wound on a synthetic resin reel and a single reel is accommodated in a case has been conventionally known. The reel used in this recording tape cartridge includes a hub, and one of upper or lower flanges is integrally formed with the hub and the other of the upper or lower flanges is welded to the hub.

When winding the recording tape on such a reel hub, the hub could be deformed by a surface pressure of the recording tape. When the hub is deformed, the recording tape partially stretched, thereby negatively affecting tape pulling in the drive device. It has been conventionally suggested to dispose a metal reinforcing ring on the hub by insert molding in order to control the deformation of the hub.

However, in a configuration in which the reinforcing ring (reinforcing tubular member) is disposed on the hub by insert molding, by contraction of the resin material when molding (cooling), the contraction of the hub portion which is controlled by the reinforcing ring and that of the flange potion which is not controlled may be different. Therefore, there is a problem that a desired hub shape is not obtained as a result.

SUMMARY

In view of the above-described problem, the present invention provides the reel capable of improving a dimensional accuracy of the hub in a configuration in which the reinforcing tubular member is disposed on the hub by insert molding.

According to an aspect of the invention, there is provided a reel including: a resin hub including an outer peripheral surface on which a recording tape is wound; a first flange integrally formed at one end portion of the hub; a second flange welded at the other end portion of the hub; and a reinforcing tubular member disposed at an inner peripheral surface of the hub by insert molding, wherein, a resin layer extending in a height direction of the hub from the one end portion side of the hub at which the first flange is integrally formed is disposed on an inner peripheral surface of the tubular member.

BRIEF DESCRIPTION OF THE DRAWINGS

Exemplary Embodiments of the present invention will be described in detail based on the following figures, wherein.

DETAILED DESCRIPTION

Figure 1A:
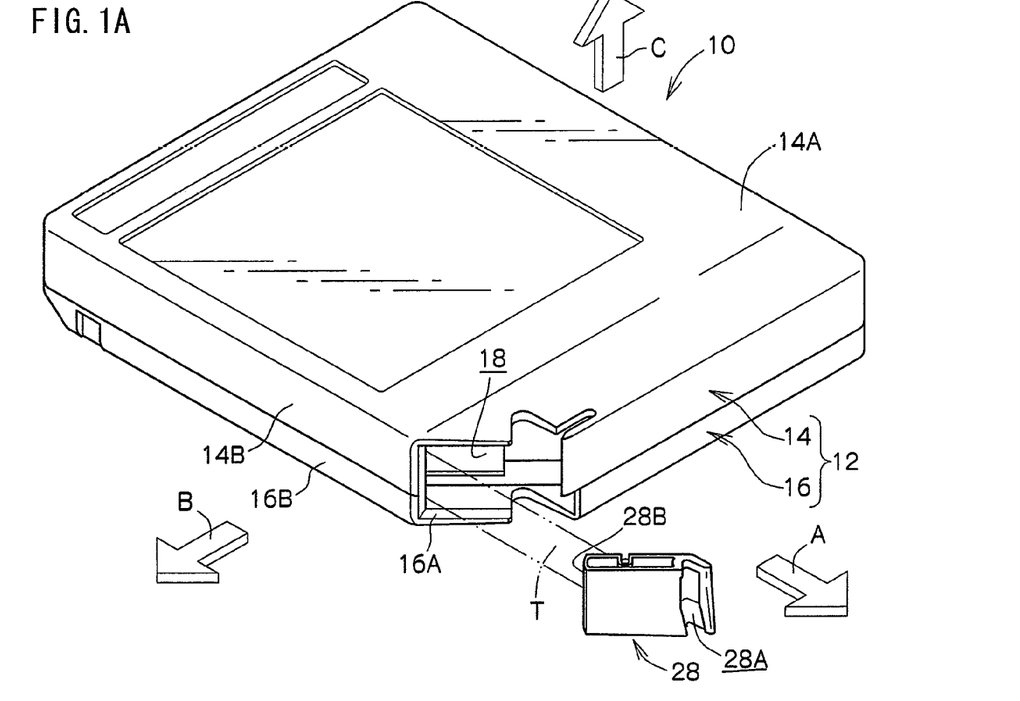
FIG. 1A is a schematic perspective view seen from above of a recording tape cartridge.
Figure 1B:
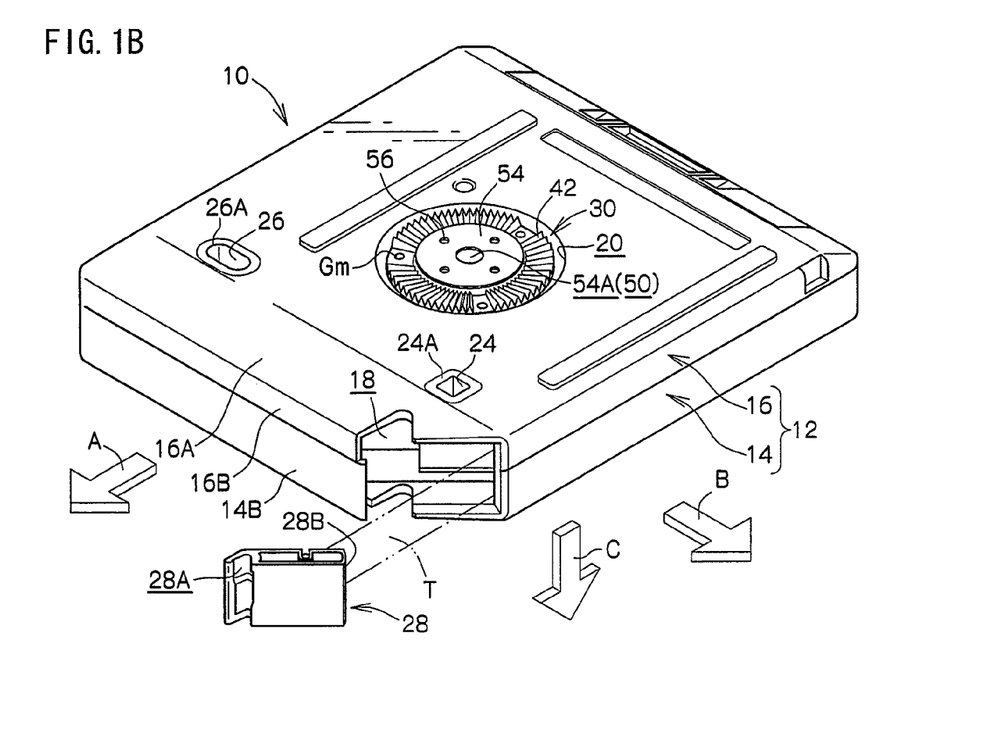
FIG. 1B is a schematic perspective view seen from below of the recording tape cartridge.

Hereinafter, the preferred exemplary embodiment of the present invention will be described in detail based on examples shown in the figures. First, a schematic configuration of a recording tape cartridge 10 provided with a reel 30 according to the exemplary embodiment will be described. Meanwhile, for convenience of description, a direction of loading the recording tape cartridge 10 into a drive device is indicated by an arrow A, as shown in FIGS. 1A and 1B, so that the arrow A is a forward direction (front side) of the recording tape cartridge 10. Also, a direction orthogonal to the arrow A direction is indicated by an arrow B, so that the arrow B is a rightward direction (right side) of the recording tape cartridge 10. In addition, a direction orthogonal to the arrow A direction and the arrow B direction is indicated by an arrow C, so that the arrow C is an upward direction (upper side) of the recording tape cartridge 10 and the reel 30.

As shown in FIGS. 1A and 1B to FIG. 3, the recording tape cartridge 10 is provided with a resin case 12. The case 12 is formed by joining an upper case 14 and a lower case 16 together. Specifically, the upper case 14 is formed such that a substantially frame-like peripheral wall 14B is disposed along an outer edge of a top plate 14A, which is substantially rectangular in planar view, in a standing manner. The lower case 16 is formed such that a substantially frame-like peripheral wall 16B is disposed along an outer edge of a bottom plate 16A, which substantially corresponds to the top plate 14A, in a standing manner. In addition, the case 12 is formed into a substantially rectangular box shape by joining the upper case 14 and the lower case 16 together by ultrasonic welding or screwing, in a state in which an open end of the peripheral wall 14B and an open end of the peripheral wall 16B abuts each other.

On a corner portion of the case 12 on a head side thereof in the loading direction into the drive device, an opening 18, which slants toward the loading direction, is formed by cutting off the top plate 14A, the peripheral wall 14B, the bottom plate 16A and the peripheral wall 16B. A circular gear opening 20, which passes through the bottom plate 16A, is formed, on a substantially central portion of the bottom plate 16A, so that a reel gear 42 is exposed as described later. An annular rib 22 is formed on an edge portion of the gear opening 20 on the bottom plate 16A in a protruding manner toward inner side of the case 12, so that the reel 30 can be fitly positioned and be prevented from dust as described later.

Further, a pair of positioning holes 24 and 26 are formed in the vicinity of a forward end on an outer surface of the bottom plate 16A of the case 12. The pair of positioning holes 24 and 26 are formed into sac-shape in projections (not shown), which are provided on the bottom plate 16A toward inner side of a standing manner into the case 12, and are disposed on a virtual line in the arrow B direction so as to be spaced apart from each other.

In addition, the positioning hole 24 on a side closer to the opening 18 is formed into substantially square when viewed from the bottom surface, circumscribing a positioning pin (not shown) of the drive device. The positioning hole 26 is formed into an elongate hole, which is longitudinal along the virtual line and having a width corresponding to a diameter of the positioning pin. Therefore, when the recording tape cartridge 10 is loaded into the drive device and the positioning pins are inserted into each of the positioning holes 24 and 26, this is correctly positioned in a horizontal direction (right and left and up and down) in the drive device.

Further, circumferences of the positioning holes 24 and 26 on the bottom plate 16A are provided with reference surfaces 24A and 26A, which are finished so as to be smoother than other portions (design surface). The reference surfaces 24A and 26A are adapted to reference surfaces (not shown) of the drive device, which are provided around the positioning pins, respectively, when the positioning pins are inserted into the positioning holes 24 and 26. Thereby, the recording tape cartridge 10 is positioned in a vertical direction in the drive device.

Figure 2:
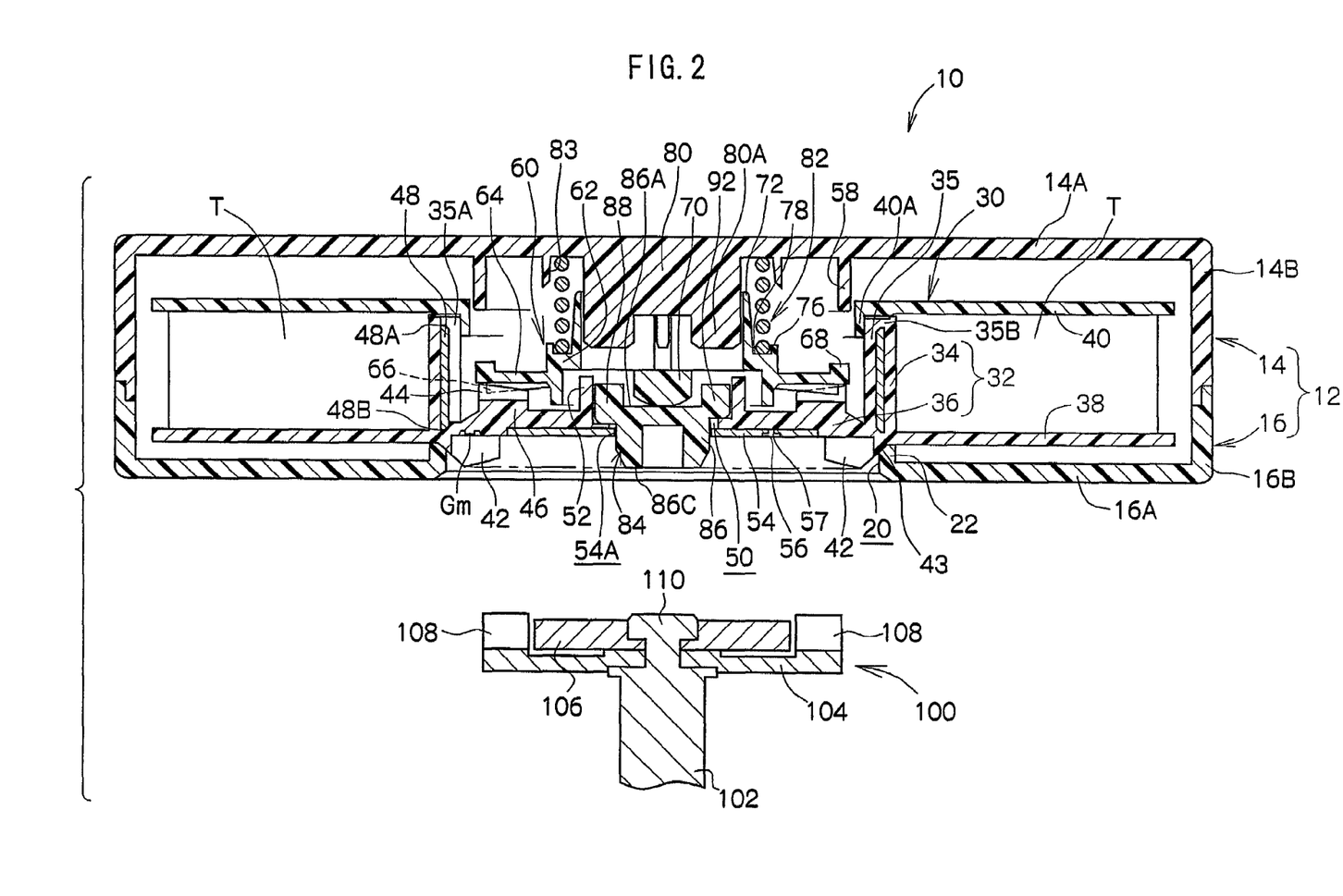
FIG. 2 is a schematic cross-sectional view when a reel of the recording tape cartridge is in a rotation locking position.
Figure 3:
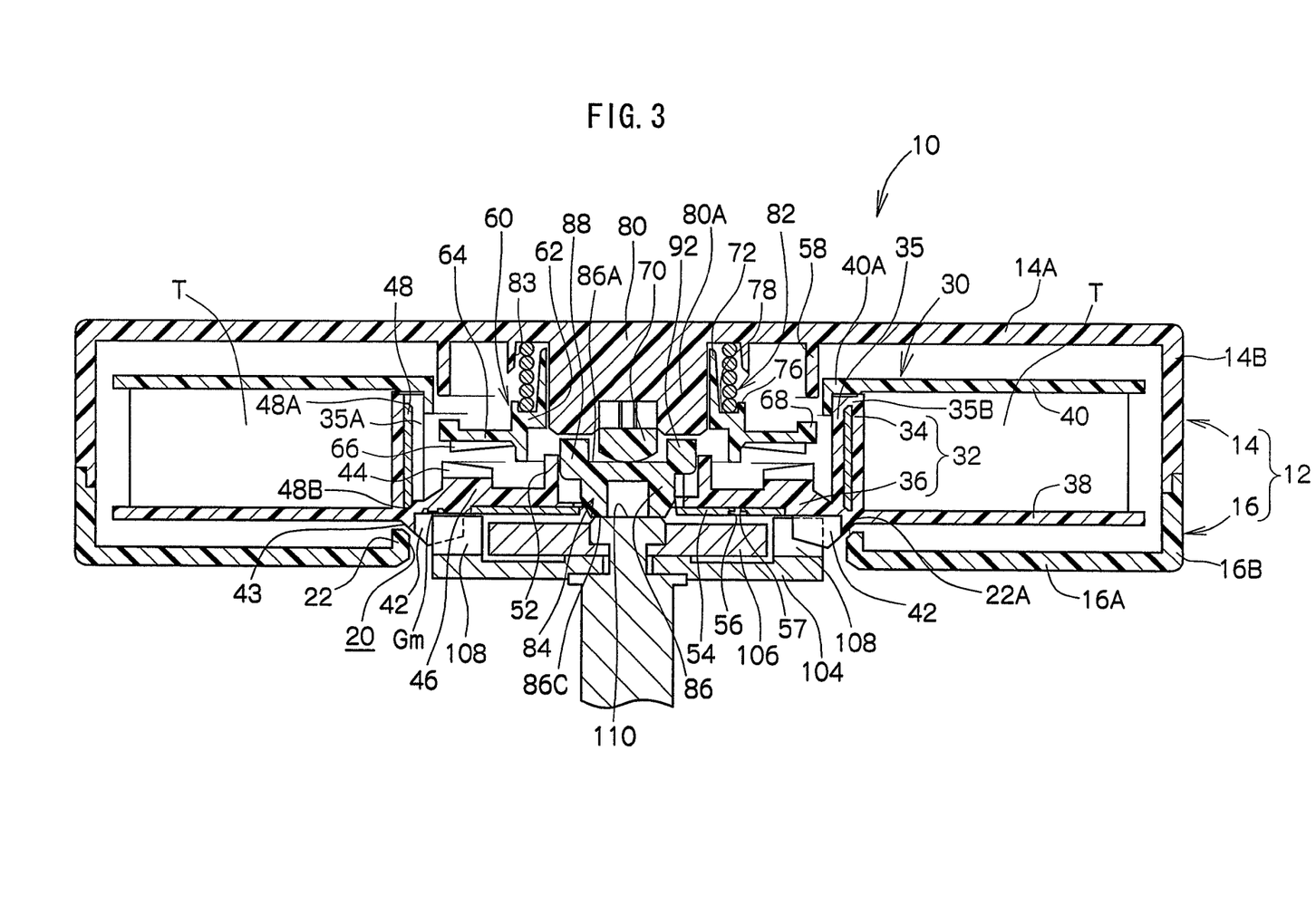
FIG. 3 is a schematic cross-sectional view when the reel of the recording tape cartridge is in a rotation allowing position.

Further, only one resin reel 30 (the detail thereof will be described later) is rotatably accommodated in the case 12, as shown in FIGS. 2 and 3. A recording tape T such as a magnetic tape is wound on this reel 30, and a reader block 28 as a reader member is attached to a tip end of the recording tape T, as shown in FIGS. 1A and 1B. The reader block 28 is accommodated and kept inside of the opening 18 of the case 12, when the recording tape cartridge 10 is not used. In this state, the reader block 28 blocks the opening 18 to prevent dust or the like from entering into the case 12.

An engaging concave portion 28A is formed on a tip end of the reader block 28. When pulling out the recording tape T in the drive device, it is pulled out from the case 12 by pulling-out means (not shown), so that it engages with the engaging concave portion 28A and is guided to a take-up reel (not shown) of the drive device. Further, an end face of the reader block 28 opposite the engaging concave portion 28A thereof is provided with a circular arc surface 28B. The circular arc surface 28B forms a portion of a take-up surface, which takes up the recording tape T by being inserted into a reel hub of the take-up reel.

Next, the reel 30 and brake for preventing rotation of the reel 30 when not in use, will be described. As shown in FIGS. 2 to 8, the reel 30 is provided with a reel hub 32, which forms an axial center thereof. The reel hub 32 is substantially cylindrical, including a base, and having a cylindrical portion 34, which opens upward, an outer peripheral surface on which the recording tape T is wound, and a bottom portion 36, which blocks a lower portion of the cylindrical portion 34 except for a through-hole 50 to be described below. A lower flange 38 extends outward radially on the same axis and in an integrated fashion from an outer peripheral edge portion of the bottom portion 36 of the reel hub 32.

Further, an upper flange 40 (omitted in FIGS. 4 and 5) is joined to an upper end portion of the reel hub 32, and the reel 30 according to the exemplary embodiment is made as a so-called 2-piece structure. That is to say, in the upper flange 40, an outer diameter thereof is same as an outer diameter of the lower flange 38 and a short tubular portion 40A of which outer diameter corresponds to an inner diameter of the cylindrical portion 34 is disposed on an axial center portion thereof, and this is concentrically fixed to the reel hub 32 by ultrasonic welding in a state in which the short tubular portion 40A inter-fits in the vicinity of an upper end of the cylindrical portion 34. Thereby, the reel 30 is configured such that the recording tape T may be wound on the outer peripheral surface of the cylindrical portion 34 of the reel hub 32, between opposite surfaces of the lower flange 38 and the upper flange 40.

The reel gear 42, which is annularly formed so as to be coaxial with the reel 30 as a whole, is formed near the outer peripheral edge portion at the lower surface of the bottom portion 36 of the reel hub 32. The reel gear 42 is engageable with a drive gear 108 disposed at a tip end of a rotation shaft 100 (to be described below) of the drive device. This reel gear 42 is configured such that a tooth tip thereof protrudes downward from the lower surface of the lower flange 38 and a tooth bottom thereof is located above the lower surface of the lower flange 38, and further, a radial outer end portion of each tooth is connected by a tapered portion 43, which is continuous to the lower flange 38 from a central portion in a height direction of the tooth to the tooth bottom.

Figure 5:
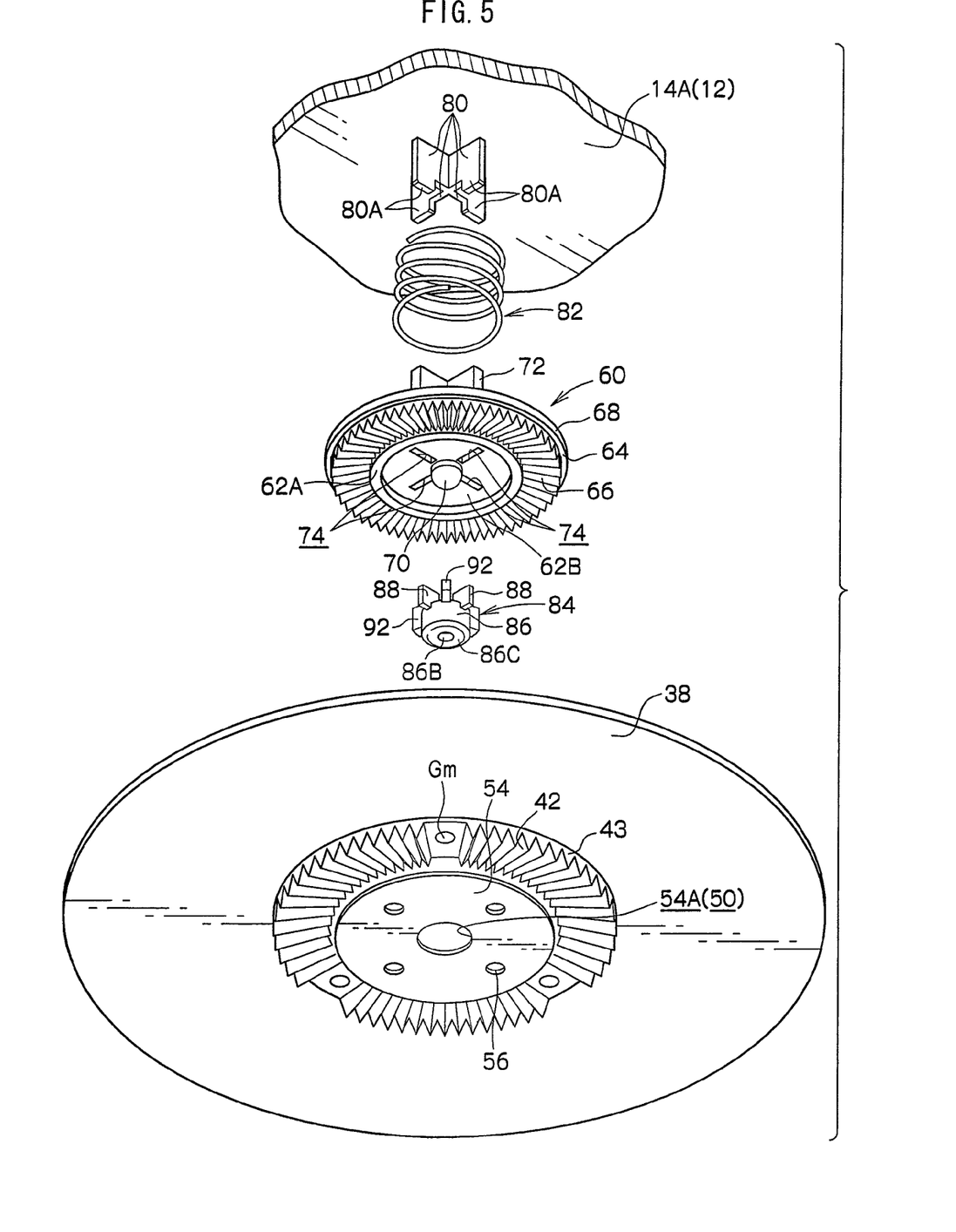
FIG. 5 is a schematic exploded perspective view of the braking means of the recording tape cartridge seen from below.

Meanwhile, a plurality of (three, in a shown example) gate traces Gm, which were made as molding resin material inlets, are formed on predetermined positions on the reel gear 42 at predetermined intervals (regular intervals) (refer to FIG. 5). In addition, an engaging gear 44, which is annularly formed so as to be coaxial with the reel 30 as a whole, is formed in the vicinity of the outer peripheral edge portion on an upper surface (inner surface) of the bottom portion 36 of the reel hub 32. The engaging gear 44 is formed on an annular base portion 46 which is slightly raised from the upper surface of the bottom portion 36, and is engageable with a braking gear 66 of a braking member 60 as described later.

Figure 6:
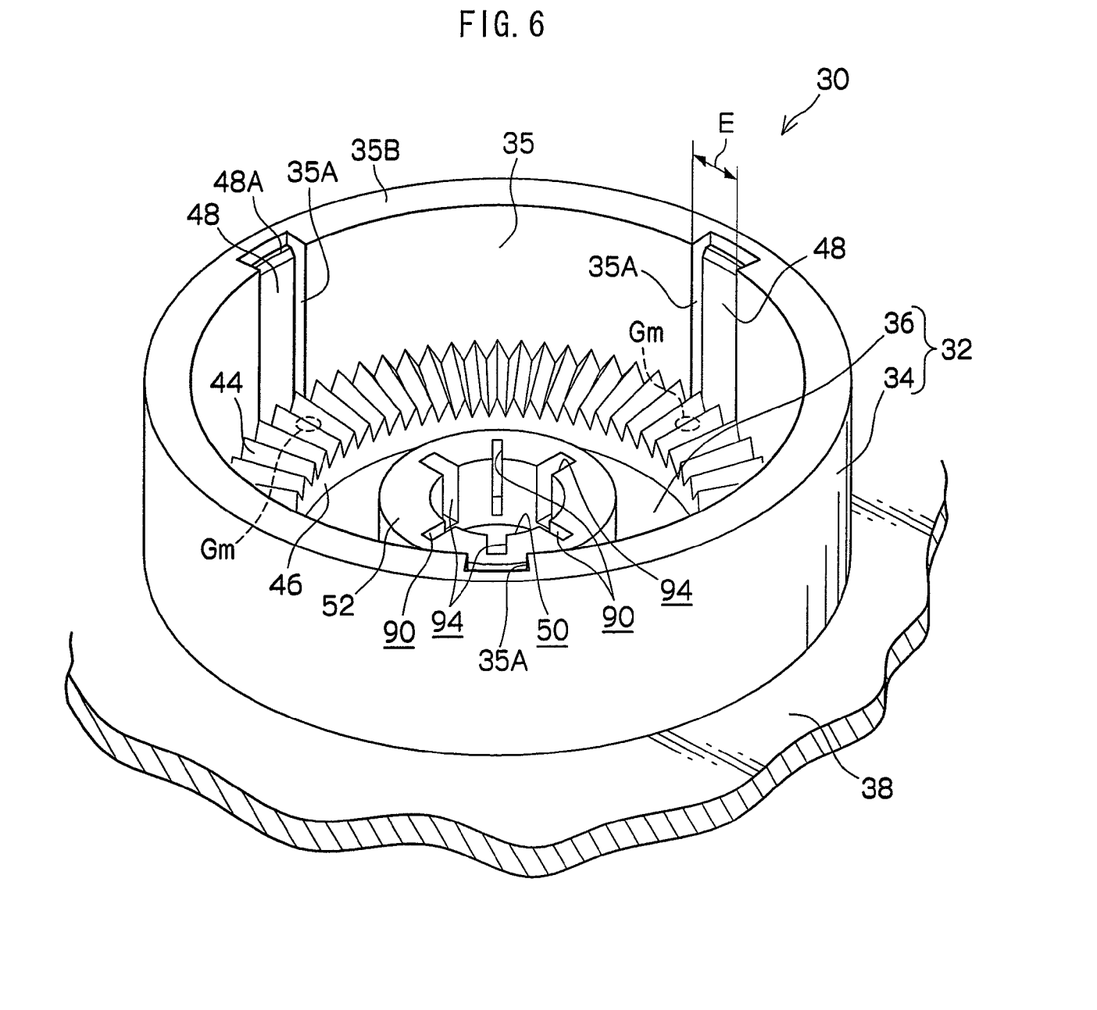
FIG. 6 is a schematic perspective view showing a configuration of a reel hub of the reel.

Further, as shown in detail in FIGS. 6 to 8, a reinforcing tubular member 48 (hereinafter, referred to as a "reinforcing ring") made of metal, for example, made of aluminum, is fixed by insert molding on an inner peripheral surface of the reel hub 32 at radially outside of the engaging gear 44 (base portion 46). By this reinforcing ring 48, strength (strength against a winding-tightening force of the recording tape T) of the reel hub 32 may be improved.

Further, a resin layer 35, which is integral with the reel hub 32 (cylindrical portion 34), is disposed on an inner peripheral surface of the reinforcing ring 48 extending in a height direction of the reinforcing ring 48 so as to cover the reinforcing ring 48 (so as to embed the reinforcing ring 48 within a thickness range in the radial direction of the reel hub 32). That is to say, the resin layer 35, which integrally extends from the lower end portion (bottom portion 36) side of the reel hub 32 in a height direction of the reel hub 32, is disposed on the inner peripheral surface of the reinforcing ring 48, and the height of the resin layer 35 is made higher than that of the reinforcing ring 48.

The resin layer 35 is formed integrally with the cylindrical portion 34, which forms an outer peripheral surface side of the reel hub 32, and a plurality of areas (three, in the shown example) into which the resin material does not go, that is to say, notches 35A, which expose a portion of the reinforcing ring 48, are formed at predetermined intervals (at regular intervals) on the resin layer 35, which forms an inner peripheral surface side of the reel hub 32, in order to hold the reinforcing ring 48 (in order to position the reinforcing ring 48 in a radial direction and a height direction thereof) in a mold (not shown).

Each of positions on which the notches 35A are formed is a predetermined area (predetermined width) E on a virtual extended line K. The virtual extended line K virtually links a rotation center O of the reel 30 (reel hub 32) and the gate trace Gm which was made as the inlet of the resin material integrally forming the reel hub 32 and the lower flange 38, as shown in FIG. 8. The resin layer 35 is substantially not formed on the predetermined area E. Thereby, it is configured such that a lower end portion 48B of the reinforcing ring 48 does not deform radially outwardly by the resin material flowing into from the gate (gate trace Gm) when molding in the die.

Further, an upper end portion 48A side of the reinforcing ring 48, except for the notches 35A, is covered with a connecting portion 35B integrally extending radially outwardly from the upper end portion of the resin layer 35 (to which it is connected). That is to say, the connecting portion 35B, which integrally connects the cylindrical portion 34 and the resin layer 35, is disposed on the upper end portion side of the reel hub 32 except for the predetermined areas E at which the notches 35A are formed, and a closed space S for accommodating the reinforcing ring 48 is formed by the cylindrical portion 34 and the resin layer 35 (refer to FIG. 7).

Figure 7:
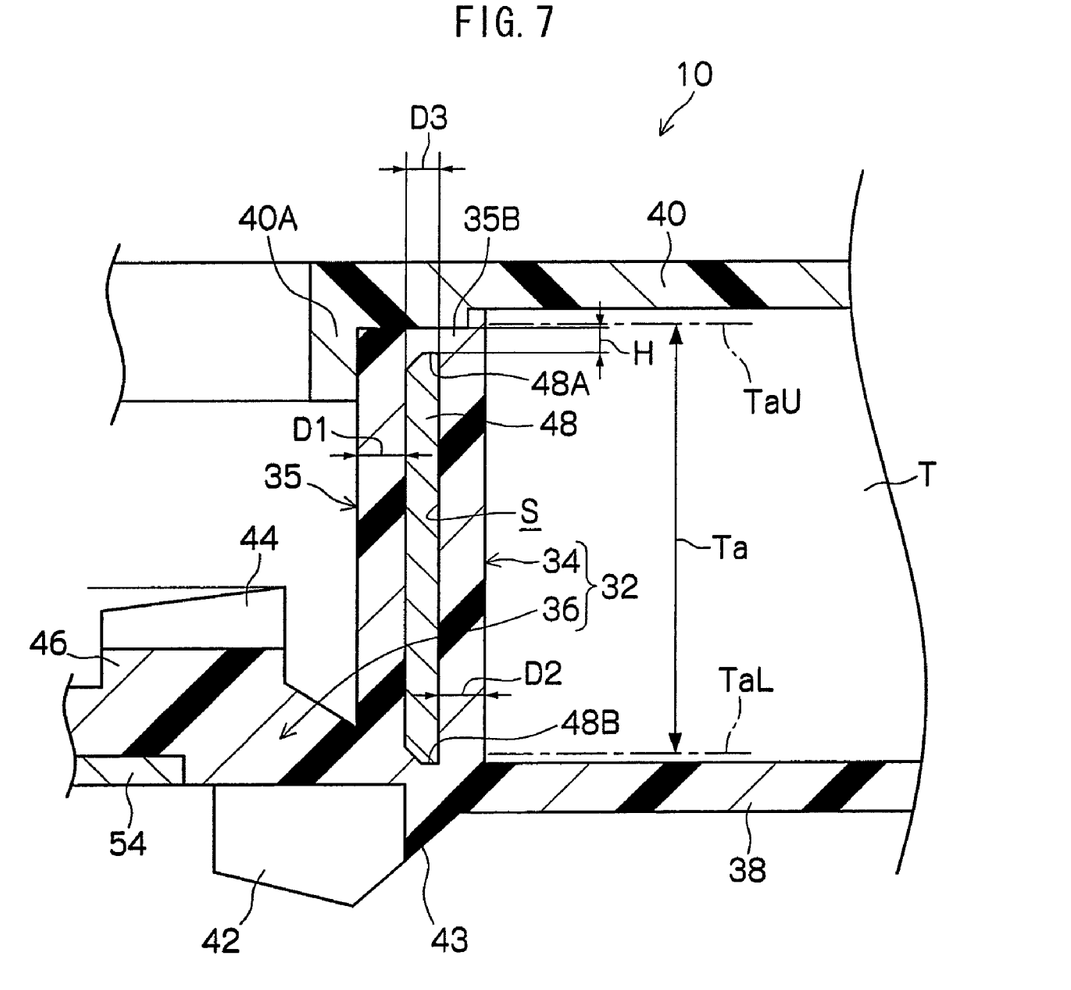
FIG. 7 is a schematic cross-sectional view showing a configuration of the reel hub of the reel.
Figure 8:
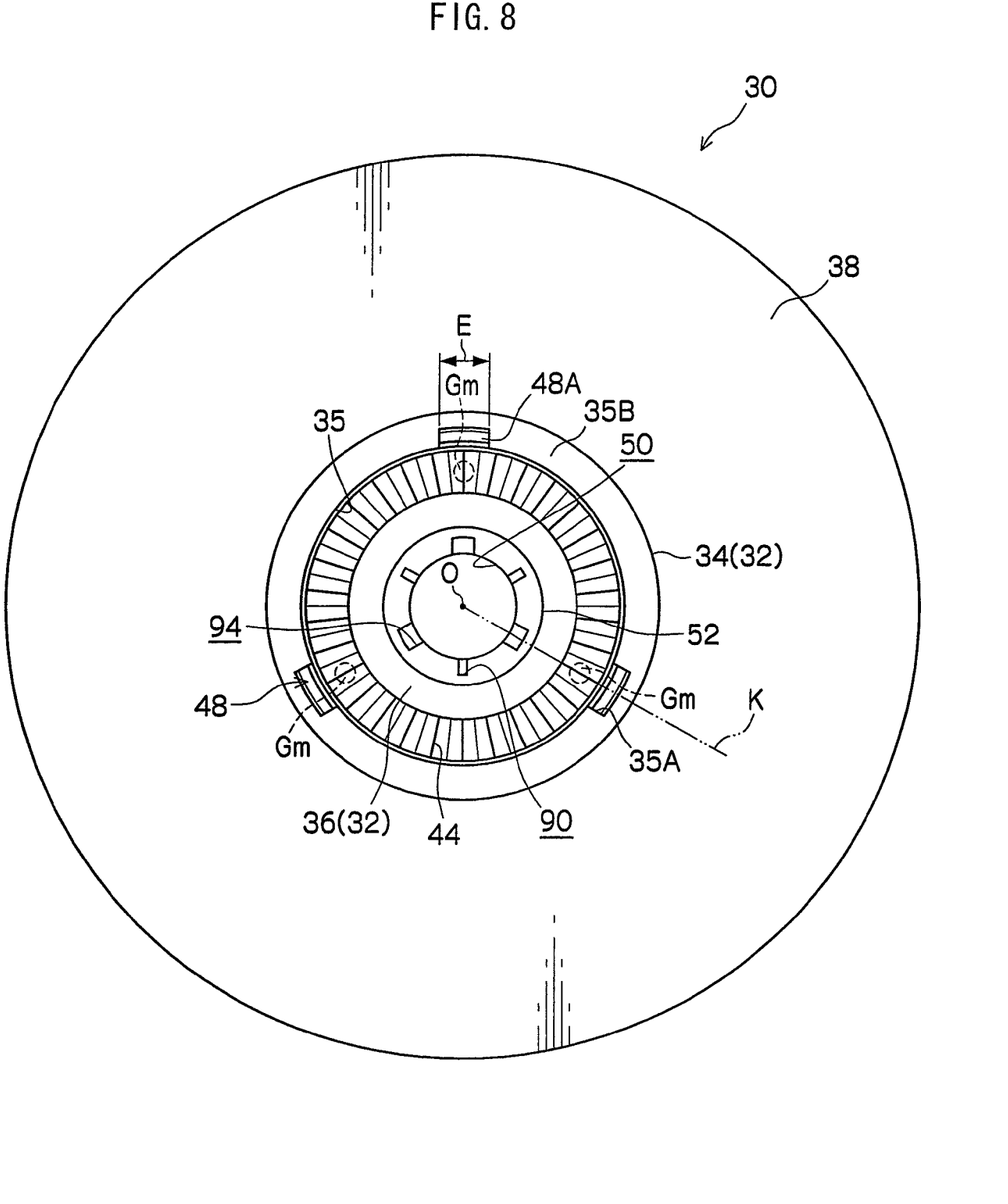
FIG. 8 is a schematic plan view showing a configuration of the reel hub of the reel.

Meanwhile, as shown in FIG. 7, a thickness of the resin layer 35 in a radial direction (thickness of a radially inner side portion of the reinforcing ring 48) D1 is set as D1=1.1 mm, and an angle of a pulling taper of the inner peripheral surface, which makes pulling-out from the die easy, is set 1-degree. In addition, a height (thickness in a vertical direction, which is orthogonal to the radial direction) H of the connecting portion 35B is set as H=0.5 mm.

Also, the reinforcing ring 48 is configured such that the upper end portion 48A thereof is disposed in the vicinity of an upper end TaU of a winding area Ta of the recording tape T on the outer peripheral surface of the reel hub 32 (cylindrical portion 34), and the lower end portion 48B thereof is disposed in the vicinity of a lower end TaL (upper surface of a base portion of the lower flange 38) of the winding area Ta. Meanwhile, the shown lower end portion 48B is at a level equal to the lower end TaL of the winding area Ta or protrudes slightly downward relative to the lower end TaL of the winding area Ta. On the other hand, the upper end portion 48A of the reinforcing ring 48 overlaps with the short tubular portion 40A of the upper flange 40 in the vertical direction.

Although, there is polycarbonate (PC) as the resin material forming the reel hub 32, the lower flange 38 and the resin layer 35, they may be formed of the resin material (capable of injection molding) other than polycarbonate (PC). In addition, a thickness in the radial direction of the cylindrical portion 34 of the reel hub 32 (thickness of a radially outer side portion of the reinforcing ring 48) D2 is set in a range D2=11.0 mm to 1.5 mm in view of ensuring a fluidity and rigidity of the resin material, and set as D2=1.5 mm in this example. Also, a thickness D3 of the reinforcing ring 48 in the radial direction is set as D3 11.0 mm, in this example.

Further, the reinforcing ring 48 is made of aluminum or aluminum alloy, and is formed of an aluminum material having a bearing force of 350 N/mm$^2$ in this example. This bearing force is set such that a deformation amount of the cylindrical portion 34 is not larger than an allowable amount relative to the winding-tightening force (winding pressure) of the recording tape T, which is wound on the outer peripheral surface of the reel hub 32 (cylindrical portion 34) (such that settling does not occur).

Further, it is sufficient that the reinforcing ring 48 is recognized as a reinforcing member for improving the rigidity of the cylindrical portion 34 of the reel hub 32 in the radial direction, and is not limited in a dimension (thickness) and material (property) as long as this function is satisfied. Therefore, steel and non-metal material such as resin and fiber-reinforced resin may be used as the reinforcing ring 48. In addition, since an aluminum material generally has corrosivity, when used as the reinforcing ring 48, it is preferable that corrosion protection (alumite treatment) such as plating is performed on the surface thereof.

In any event, this reel 30 is configured such that the resin layer 35 is disposed on the inner peripheral surface of the reinforcing ring 48, even when the metal material is used as the reinforcing ring 48, exposure of the metal portion may be reduced. Therefore, it is possible to reduce concern that a surface condition of the recording tape T changes due to corrosion of the reinforcing ring 48.

In the meantime, a reel plate 54, which is an annular metal plate formed of a magnetic material, is coaxially and integrally disposed on the radially inner side of the reel gear 42 on the lower surface of the bottom portion 36 of the reel hub 32 by insert molding. That is to say, a plurality (four, in the shown example) small holes 56 are formed on the reel plate 54 at predetermined intervals (regular intervals) in a peripheral direction thereof, and a step portion 57 of which opening diameter on a lower side is larger than an opening diameter on an upper side is formed on an inner peripheral surface of the small hole 56 (refer to FIGS. 2 and 3). Therefore, the reel plate 54 is configured such that after this is set in the die, the resin material enters through the small holes 56 and the resin material goes into the lower surface of the step portion 57 and is fixed, so that this is attached to the bottom portion 36.

Further, a through-hole 50, which passes through the bottom portion 36, is disposed on an axial center portion on the bottom portion 36 of the reel hub 32. Also, a short cylindrical boss portion 52 for clutch is provided on the upper surface of the bottom portion 36 in a standing manner along an edge portion of the through-hole 50. The boss portion 52 for clutch will be described together with a clutch member 84 to be described later. Also, the axial center portion of the reel plate 54 is provided with a transparent hole 54A, and an inner diameter of the transparent hole 54A is made slightly smaller than an inner diameter of the through-hole 50.

In addition, the reel 30 is accommodated in the case 12 and is placed on the annular rib 22 when not used. Specifically, the reel 30 is configured such that a radially outer side portion of the tapered portion 43 on the bottom portion 36 (neighborhood of an inner peripheral edge portion of the lower flange 38) abuts the upper end surface of an annular rib 22. Therefore, radial movement is regulated as an upper end inner peripheral edge portion of the annular rib 22 is formed with a tapered surface 22A corresponds to the tapered portion 43. In this manner, it is configured to prevent dust from entering thereinto.

In such a state, the reel 30 is located in the case 12 as a whole and exposes the reel gear 42 and the reel plate 54 from the gear opening 20 (refer to FIG. 1B). That is to say, the reel gear 42 faces outside of the case 12 from the gear opening 20 without protruding from an outer surface (lower surface) of the bottom plate 16A. Also, the through-hole 50 faces the gear opening 20 through the transparent hole 54A of the reel plate 54.

Thereby, an operation of the reel 30, that is to say, chucking (holding) and rotation drive from outside of the case 12, is possible. Also, in this state, an annular regulation rib 58, which is disposed on the top plate 14A in a standing manner, enters an upper end portion inner peripheral surface side of the reel hub 32 of the reel 30. The regulation rib 58 is configured such that an outer peripheral surface thereof comes closer to an inner peripheral surface of the short tubular portion 40A of the upper flange 40, thereby preventing bumping of the reel 30 in the case 12.

Figure 4:
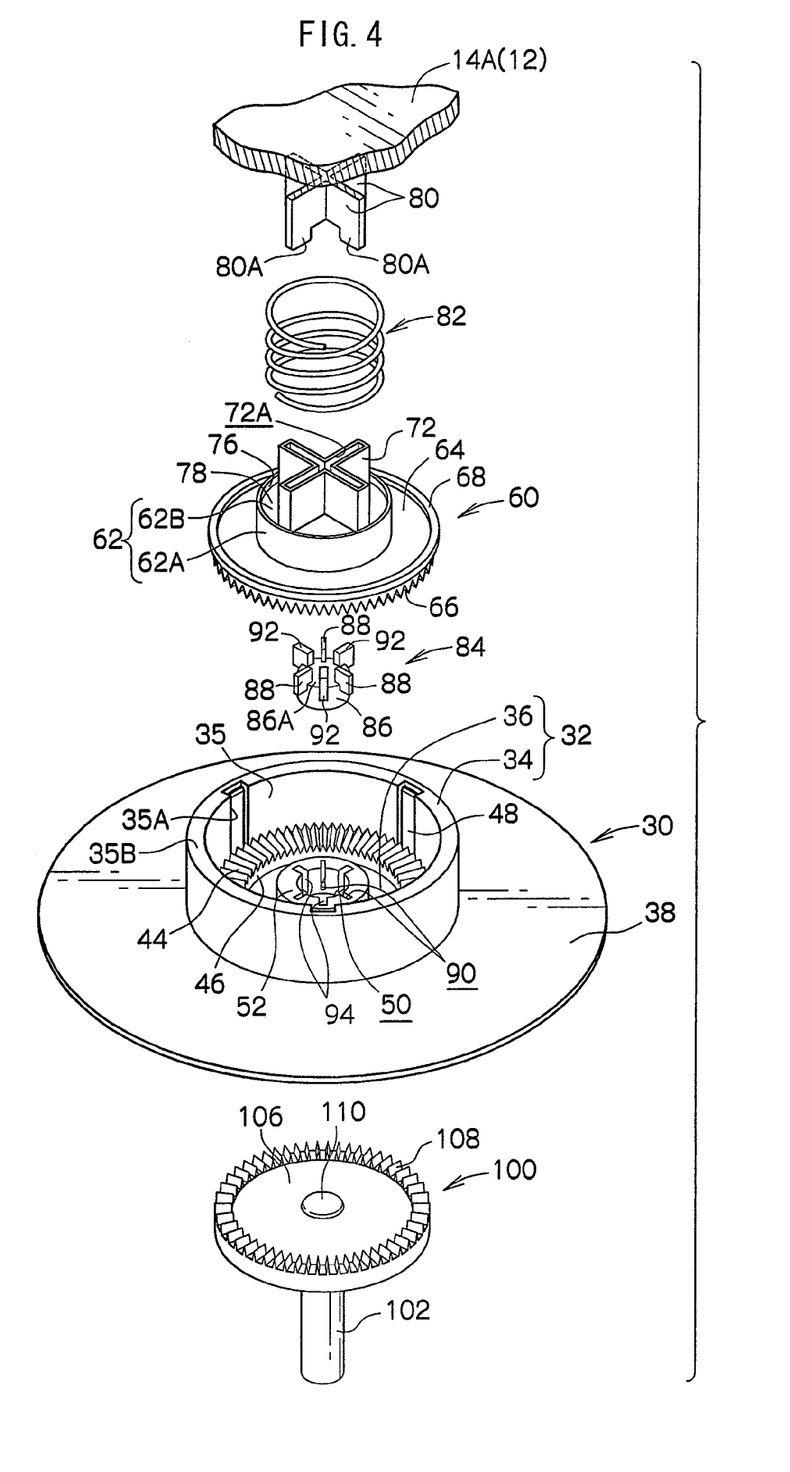
FIG. 4 is a schematic exploded perspective view of braking means of the recording tape cartridge and a rotation shaft of a drive device seen from above.

Further, the recording tape cartridge 10 is provided with the braking member 60 as braking means for preventing the rotation of the reel 30 when not used. As shown in FIGS. 4 and 5, the braking member 60 has a base portion 62. The base portion 62 is formed into a cylindrical shape which opens downward with a substantial bottom. The base portion 62 is provided with a tubular portion 62A formed into a short cylindrical shape, and a circular plate portion 62B blocking an upper end of the tubular portion 62A. Then, an annularly formed ring portion 64 extends radially outside from an intermediate portion in a direction of axis on the outer peripheral portion of the base portion 62 (tubular portion 62A) along the entire circumference thereof.

A braking gear 66 is disposed along the entire circumference of the lower surface of the ring portion 64. That is to say, the braking gear 66 is annularly formed as whole and is configured to be engageable with the engaging gear 44 of the reel 30. Also, an annular reinforcing rib 68 is disposed on the upper surface of the ring portion 64 in a standing manner along an outer edge portion thereof, thereby ensuring the rigidity of the ring portion 64 (braking gear 66). In addition, a slide-contact projection 70 is provided from the axial center portion of the lower surface on the circular plate portion 62B of the base portion 62 (radially inside of the tubular portion 62A) in a protruding manner. A tip end portion of the slide-contact projection 70 is formed into a substantially spherical surface, thereby substantially point-contacting a clutch member 84 as described later.

In the meantime, a cross-shaped projection 72, within which an insertion groove 72A in a substantially cross-shape in planar view is formed, is provided on the upper surface of the circular plate portion 62B in a standing manner. Also, a through-hole 74 is provided to passes through the circular plate portion 62B in a plate-thickness direction. The through-hole 74 is divided in quarters and each of them is formed in rectangular so as to communicate with the radially outer side portion except the axial center portion (crossing portion) in the insertion groove 72A formed into cross-shape in planar view.

Thereby, each of the through-holes 74 is located so as to be adjacent to the radially outer side of the slide-contact projection 70 and opens to the inner portion of the tubular portion 62A. Also, an annular rib 76 is disposed on an upper end outer peripheral edge portion of the base portion 62 in a standing manner. An upper surface of the circular plate portion 62B between the rib 76 and the cross-shaped projection 72 is provided with a spring receiving surface 78 which one end portion of a compression coil spring 82 as described later abuts.

The braking member 60 thus configured is inserted into the reel hub 32 to be movable in the vertical direction (axial line direction of the reel 30) and substantially coaxial. That is to say, the braking member 60 may take a position to engage the braking gear 66 with the engaging gear 44 of the reel 30 (reel hub 32) (rotation locking position) and a position to release the engagement (rotation allowing position) by moving in the vertical direction.

In addition, a cross-shaped rib 80, disposed on the top plate 14A of the case 12 in a downwardly protruding fashion, enters the insertion groove 72A of the cross-shaped projection 72 of the braking member 60. The cross-shaped rib 80 is formed into a baffle-shape in which two thin plate pieces are crossed so as to be orthogonal to each other, and is configured to prevent the rotation of the braking member 60 relative to the case 12 by engaging with the cross-shaped projection 72 (groove wall of the insertion groove 72A).

Therefore, the braking member 60 may prevent the rotation of the reel 30 by engaging the braking gear 66 thereof with the engaging gear 44 of the reel hub 32. Meanwhile, the cross-shaped rib 80 is configured to maintain a state in which this enters the insertion groove 72A along the entire movement stroke of the braking member 60 in the vertical direction and to act to guide a movement direction of the braking member 60 in the vertical direction.

Further, a protruding piece 80A, which is insertable to each through-hole 74 of the braking member 60, is disposed on a lower end portion of the cross-shaped rib 80 in an extending manner. Each protruding piece 80A is located in the insertion groove 72A when the braking member 60 is located in the rotation locking position, and enters into the through-hole 74 when the braking member 60 is located in the releasing position, and protrudes from the lower surface of the circular plate portion 62B (passes through the through-hole 74). By thus disposing each protruding piece 80A in an extending manner, the cross-shaped rib 80 not only prevents the rotation of the braking member 60 relative to the case 12, but also increases an engaging amount (insertion depth) with the braking member 60, thereby preventing tilt of the braking member 60 relative to the case 12.

In addition, a compression coil spring 82, which is recognized as biasing means in the general meaning, is disposed between the spring receiving surface 78 of the braking member 60 and the top plate 14A. One end portion of the compression coil spring 82 abuts the spring receiving surface 78 and the other end portion thereof abuts on the top plate 14A, and the other end portion is located inside of the annular wall portion 83, which is disposed in a protruding manner from the radially outer side of the cross-shaped rib 80 in the top plate 14A, so that the compression coil spring 82 does not misalign in the radial direction.

Then, the braking member 60 is biased downward by biasing force of the compression coil spring 82, and the braking gear 66 generally is engaged with the engaging gear 44, thereby surely preventing careless rotation of the reel 30 (braking member 60 is located on the rotation locking position). Also, by this biasing force, the reel 30 also is biased downward to abut on the annular rib 22, so that this is not bumped in the case 12.

In addition, the recording tape cartridge 10 is provided with the clutch member 84 as a releasing member operated from outside when releasing the lock state of the reel 30 by the braking member 60. The clutch member 84 is disposed between the bottom portion 36 of the reel 30 and the braking member 60. As shown in FIGS. 4 and 5, the clutch member 84 has a clutch body 86 formed in a substantially cylindrical shape. The clutch body 86 is formed such that an outer diameter thereof is substantially the same as that of the transparent hole 54A of the reel plate 54, that is to say, slightly smaller than an inner diameter of the through-hole 50, which conforms to the inner diameter of the boss portion 52 for clutch.

A planar axial center portion upper end surface of the clutch body 86 is provided with a slide-contact surface 86A, which always abuts on the slide-contact projection 70 of the braking member 60. Also, a planar lower end surface around a body reducing hole 86B, which is provided so as to open downward in the clutch body 86, is made a pressuring operating surface 86C. Then, the clutch member 84 moves upward against the biasing force of the compression coil spring 82 when the pressing operation surface 86C is pushed, thereby making the braking member 60 to move to the rotation allowing position.

Further, the clutch member 84 is provided with a rotation regulation rib 88, which hangs radially outer side of an outer peripheral surface of the clutch body 86. A plurality of (three, in the shown example) rotation regulation ribs 88 are disposed on the clutch body 86 in a peripheral direction thereof at regular intervals, and each rotation regulation rib 88 is radially disposed in plane view. Also, each rotation regulation rib 88 protrudes above the slide-contact surface 86A so as to stride from an upper end surface around the slide-contact surface 86A of the clutch body 86 to an outer peripheral surface in the vicinity of the upper end surface (continuous to each of them).

Each rotation regulation rib 88 enters into a rotation regulation groove 90, which is formed to make a recess on an inner peripheral surface of the boss portion 52 for clutch. That is to say, three rotation regulation grooves 90 are disposed on the boss portion 52 for clutch in a peripheral direction thereof at regular intervals. Each rotation regulation groove 90 is opened upward at an upper end of the boss portion 52 for clutch. Thereby, the clutch member 84 is capable of moving in the vertical direction while being guided by the rotation regulation groove 90 of the boss portion 52 for clutch at the rotation regulation rib 88.

Further, each rotation regulation rib 88 is configured to maintain the state to enter the rotation regulation groove 90 of the boss portion 52 for clutch even when the clutch member 84 moves upward to locate the braking member 60 on the rotation allowing position. Thereby, the clutch member 84 is configured not to be able to rotate relative to the reel 30, that is to say, it is configured to rotate always integrally with the reel 30.

Further, since each rotation regulation groove 90 is blocked at the lower end portion of the boss portion 52 for clutch, it is possible to prevent the clutch member 84 from dropping out from the reel hub 32 by the rotation regulation rib 88 and the rotation regulation groove 90, and the clutch member 84 is provided with a seat rib 92, which prevents the dropping out of the reel hub 32, besides the rotation regulation rib 88.

A plurality of (three in total, on an intermediate portion in a peripheral direction between each rotation regulation rib 88, in the shown example) seat ribs 92 are disposed on the clutch body 86 in a peripheral direction thereof at regular intervals. Seat ribs 92 protrude upward and radially outwards so as to stride from the upper end surface around the slide-contact surface 86A of the clutch body 86 to the outer peripheral surface in the vicinity of the upper end surface, and are radially disposed in plane view, similar to the rotation regulation rib 88.

Each seat rib 92 is configured to enter a stopper groove 94, which is disposed to make a recession in the inner peripheral surface of the boss portion 52 for clutch. That is to say, each stopper groove 94 is disposed in the intermediate portion in the peripheral direction of each rotation regulation groove 90, in the peripheral direction of the boss portion 52 for clutch at regular intervals. Each stopper groove 94 opens upward at the upper end of the boss portion 52 for clutch, and the bottom portion upper surface, which blocks the lower end portion thereof, is provided with a stopper surface 94A. A lower end surface of each seat rib 92 is adapted to abut (seat on) the stopper surface 94A, when the braking member 60 is on the rotation locking position.

Further, as shown in FIGS. 2 and 3, a rotation shaft 100 is provided with a rotation axis 102, and a circular plate-shaped rotation table 104 is coaxially and integrally disposed on an upper end of the rotation axis 102. A drive gear 108, which is engageable with the reel gear 42 of the recording tape cartridge 10, is annularly formed on the upper surface of the rotation table 104 and the outer peripheral edge portion. Also, on the upper surface of the rotation table 104, a magnet 106 formed in a substantially circular plate-shape is coaxially disposed at a radially inner side of the drive gear 108. A releasing projection 110, which abuts the pushing operation surface 86C of the clutch member 84, is formed on the axial center portion of the rotation table 104.

Next, an action of the recording tape cartridge 10 provided with the reel 30 and the braking means configured as above will be described. In the recording tape cartridge 10, the braking member 60 is located on the rotation locking position to engage the braking gear 66 with the engaging gear 44 by the biasing force of the compression coil spring 82, when not used. Therefore, the reel 30 is prevented from rotating relative to the case 12. At this time, the reel gear 42 of the reel 30 exposes from the gear opening 20, and the clutch body 86 of the clutch member 84 is inserted into the through-hole 50 and the transparent hole 54A, to face the gear opening 20.

On the other hand, when using the recording tape T, the recording tape cartridge 10 is loaded into a bucket (not shown) of the drive device in the arrow A direction. Then, when the recording tape cartridge 10 is loaded into the bucket with a predetermined depth, the bucket is lowered and the rotation shaft 100 of the drive device relatively comes closer to the gear opening 20 of the case 12 (moves upward) to hold the reel 30. Specifically, the rotation shaft 100 engages the drive gear 108 thereof with the reel gear 42 while adsorb-retaining the reel plate 54 by the magnet 106 out of touch with the same.

With this engagement of the reel gear 42 with the drive gear 108, that is to say, with the relative movement of the rotation shaft 100 to a closer side to the case 12 in the axial direction, the releasing projection 110 of the rotation shaft 100 abuts on the pushing operation surface 86C of the clutch member 84, thereby raising the clutch member 84 upward against the biasing force of the compression coil spring 82. Thereby, the braking member 60, which abuts on the clutch member 84 at the slide-contact projection 70, moves upward, thereby releasing the engagement of the braking gear 66 with the engaging gear 44, and moves to a relative rotation allowing position relative to the reel 30.

That is to say, when the rotation shaft 100 relatively moves upward, the reel 30 is raised upward together with the clutch member 84 and the braking member 60 (without changing the relative position) against the biasing force of the compression coil spring 82, and the braking member 60 reaches the rotation allowing position (relative to the case 12) and the lower flange 38 leaves from the annular rib 22 (tapered surface 22A). Thereby, the reel 30 floats in the case 12 and becomes rotatable in a state out of contact with the inner surface of the case 12.

In addition, due to a descent of the bucket, that is to say, the recording tape cartridge 10 in the drive device, the positioning pins of the drive device enter each of the positioning holes 24 and 26 of the case 12, respectively, and the reference surface of the drive device abuts on each of the reference surfaces 24A and 26A of the case 12. Thereby, the horizontal direction and the vertical direction of the recording tape cartridge 10 relative to the drive device are positioned. Then, pull-out means of the drive device pulls the reader block 28 out of the case 12 and guides the reader block 28 to the take-up reel of the drive device, while engaging with the engaging concave portion 28A of the reader block 28.

Then, the reader block 28 is inserted into the reel hub of the take-up reel, and the circular arc surface 28B thereof forms a portion of the take-up surface, which takes up the recording tape T. In this state, when the reader block 28 rotates integrally with the take-up reel, the recording tape T is pulled out of the case 12 through the opening 18, while being wound on the reel hub of the take-up reel. Meanwhile, at this time, the reel 30 of the recording tape cartridge 10 rotates in synchronization with the take-up reel, by the rotational force of the rotation shaft 100, which is transmitted by the drive gear 108 engaging with the reel gear 42.

Then, by a recording/playback head (not shown), which is disposed along a predetermined tape path of the drive device, information is recorded on the recording tape T, or the information recorded on the recording tape T is played back. Meanwhile, at this time, the slide-contact projection 70 of the braking member 60, which is not rotatable relative to the case 12, slide-contacts the slide-contact surface 86A of the clutch member 84, which rotates together with the reel 30 relative to the case 12. That is to say, the clutch member 84 is configured to hold the braking member 60 in the rotation allowing position, with a state abutting the releasing projection 110 on the pushing operation surface 86C maintained, in a state in which the reel gear 42 engages with the drive gear 108.

In addition, when the reel 30 rotates, there is no relative rotation between the clutch member 84, which rotates integrally with the reel 30, and the rotation shaft 100, which drives the reel 30, the pushing operation surface 86C and the releasing projection 110 do not slide-contact each other, and the slide-contact surface 86A of the clutch member 84 and the slide-contact projection 70 of the braking member 60, which is not rotatable relative to the case 12, slide-contact each other. In this manner, since there is no relative rotation between the rotation axis 102 and the clutch member 84, there is not a problem that the releasing projection 110 and the pushing operation surface 86C are abraded.

On the other hand, when the recording of the information on the recording tape T, or the playback of the information recorded on the recording tape T is finished, the recording tape T is rewound on the reel 30 and the reader block 28 is held in the vicinity of the opening 18 of the case 12. Then, the bucket into which the recording tape cartridge 10 is loaded is raised. Then, the engagement of the reel gear 42 with the drive gear 108 is released and the abutment of the releasing projection 110 and the pushing operation surface 86C of the clutch member 84 is released, and the clutch member 84 moves downward together with the braking member 60 (while maintaining the abutment state) by the biasing force of the compression coil spring 82.

Thereby, each seat rib 92 of the clutch member 84 abuts the stopper surface 94A and the braking gear 66 of the braking member 60 engages with the engaging gear 44. That is to say, the braking member 60 returns to the rotation locking position, at which this prevents the rotation of the reel 30 relative to the case 12. Also, the reel 30 moves downward with the motion, which the braking member 60 and the clutch member 84 moves by the biasing force of the compression coil spring 82, and while making the lower flange 38 abut on the annular rib 22, returns to an initial state in which the reel gear 42 is exposed from the gear opening 20. In this state, the recording tape cartridge 10 is ejected from the drive device (bucket).

Next, an action of the reel 30 according to the exemplary embodiment will be described in detail. The recording tape T is wound on the outer peripheral surface of the reel hub 32 (cylindrical portion 34) of the reel 30. Therefore, the winding pressure (winding-tightening force) by the recording tape T is applied to the reel hub (cylindrical portion 34) in a radially inner direction. Herein, a highly rigid reinforcing ring 48 is fixed on the inner peripheral surface of the reel hub 32 (cylindrical portion 34) by the insert molding. Therefore, sufficient rigidity with respect to the winding pressure of the recording tape T is ensured. That is to say, in the reel hub 32, falling deformation (inward falling) in the radially inner direction of the cylindrical portion 34 due to the winding pressure of the recording tape T is controlled to be not larger than the allowable amount.

In the reel 30, in which the reel hub 32 (cylindrical portion 34) and the lower flange 38 are integrally molded, and the reinforcing ring 48 is fixed to the inner peripheral surface of the reel hub 32 (cylindrical portion 34) by insert molding, when molding (cooling) with the die, the contraction (percentage) of the resin material in the reel hub 32 (cylindrical portion 34) is small (there is little contraction), since it is possible to control the contraction by the reinforcing ring 48. On the other hand, in the lower flange 38, since it is not possible to control the contraction by the reinforcing ring 48 (the reinforcing ring 48 is not disposed in the lower flange 38 in a vertical direction thereof), the contraction (percentage) of the resin material is large, so that the resin material contracts in a direction in which the diameter (outer diameter) thereof becomes smaller.

Figure 10A:
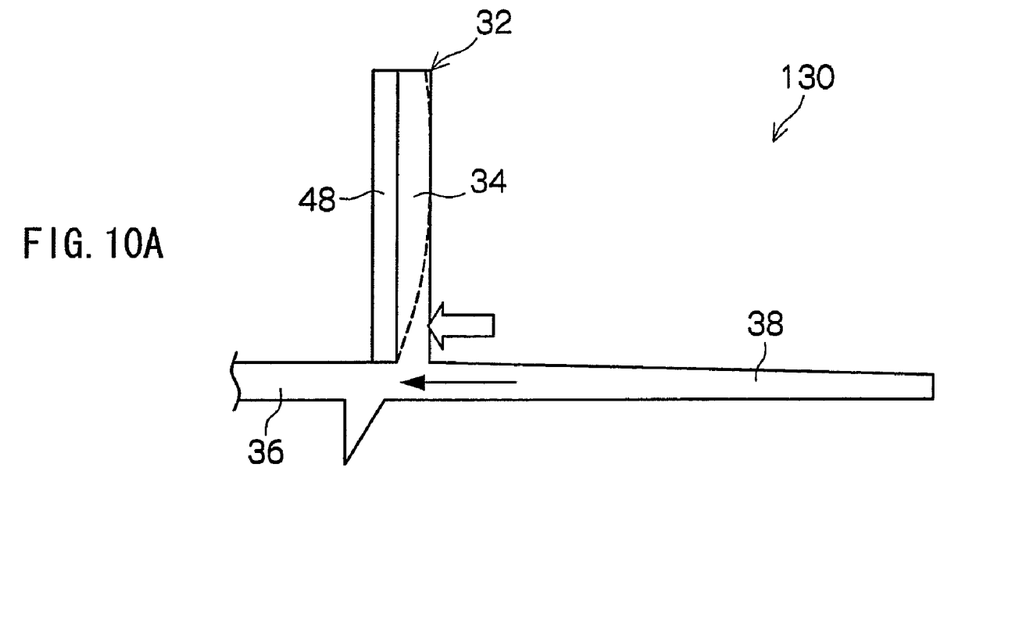
FIG. 10A is a schematic diagram illustrating contraction of the reel without the resin layer.

That is to say, as shown in FIG. 10A, for example, in the reel 130 according to a comparative example, which does not have the resin layer 35 on the inner peripheral surface of the reinforcing ring 48, the contraction of the cylindrical portion 34 of the reel hub 32 is controlled by the reinforcing ring 48, except for the lower end portion thereof; however, the diameter of the outer peripheral surface of the lower end portion of the cylindrical portion 34 contracts greatly (for example, contracting by about 50 μm to 60 μm per radius) as indicated by the broken line (exaggerated for clarity) in the drawing, due to a flow of the resin material that accompanies the contraction of the lower flange 38. In this manner, when only the lower end portion in the vicinity of the lower flange 38 of the reel hub 32 contracts, part of the diameter (outer diameter) of the reel hub 32 (only the lower end portion thereof) becomes small (becomes different), and it may be difficult to obtain a reel hub 32 having a uniform diameter in a height direction.

Figure 9A:
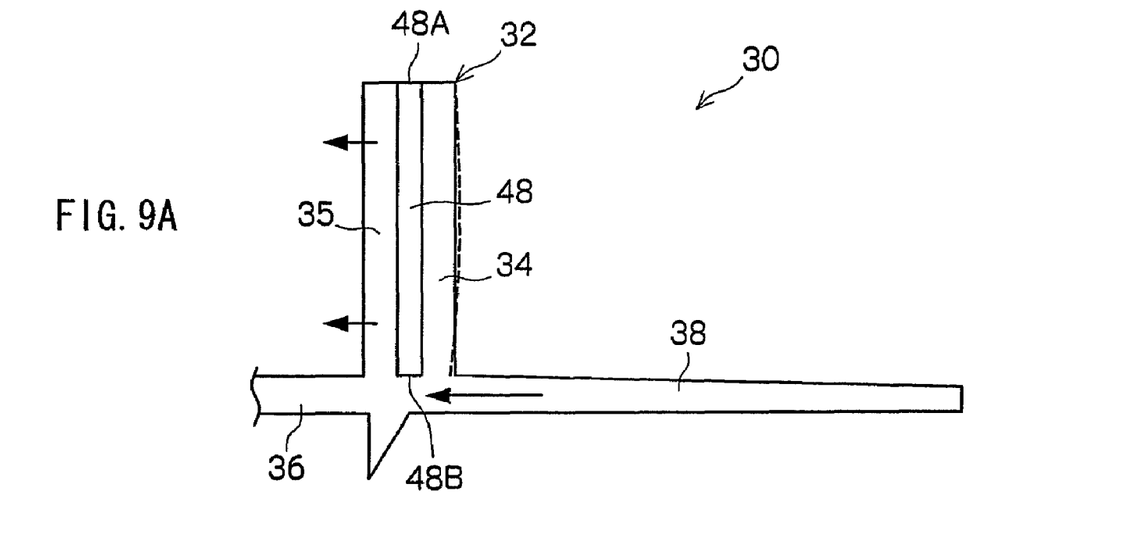
FIG. 9A is a schematic diagram illustrating an effect of the reel having a resin layer for controlling contraction.

However, in the reel 30 according to the exemplary embodiment, as shown in FIG. 9A, the resin layer 35 having a thickness D1 in the radial direction of, for example, D1=1.1 mm, is disposed on the inner peripheral surface of the reinforcing ring 48 with the same height as that of the reinforcing ring 48, due to the contraction of the resin layer 35, the reinforcing ring 48 and the cylindrical portion 34 are pulled in a contraction direction thereof. Therefore, it is possible to make the contraction of the reel hub 32 more similar to that of the lower flange 38. That is to say, due to the above, it is possible to reduce the amount by which the diameter of the lower end portion of the cylindrical portion 34 of the reel hub 32 becomes smaller (the amount it contracts) than the diameter of other portions.

In this manner, since the complete reel hub 32 uniformly contracts in the reel 30 (in the height direction) in the exemplary embodiment, the decrease in the diameter of the outer peripheral surface of the lower end portion of the cylindrical portion 34 is significantly controlled (for example, to about 10 µm per radius) as indicated by the broken line (exaggerated for clarity). Therefore, the diameter of the complete reel hub 32 may be made more uniform (in the height direction), than the reel 130 of the comparative example shown in FIG. 10A. When the diameter of the reel hub 32 is uniform in the height direction, a stress, which the recording tape T wound on the reel hub 32 receives in the width direction (height direction) thereof becomes uniform, so that it is possible to control a partial stretching deformation of the recording tape T, and it becomes possible to stabilize winding tightness of the recording tape T.

That is to say, since the resin layer extending from the one end portion side of the hub in the height direction of the hub is disposed on the inner peripheral surface of reinforcing tubular member, when integrally molding (cooling) the hub and a first flange, the contraction of the resin layer in the hub portion approaches the contraction in the flange portion. Therefore, a partial contracting deformation of the hub is controlled, and the diameter of the hub becomes uniform, thereby improving a dimension accuracy of the hub.

Also, since the height of the resin layer is made equal or higher than the height of the tubular member, the partial contracting deformation of the hub may be more effectively controlled, thereby making the diameter of the hub uniform.

Further, a connecting portion in which the hub and the resin layer are integrally connected is disposed on the other end portion side of the hub, at which a second flange is welded, and since a closed space that accommodates the tubular member is formed from the hub and the resin layer, the contraction in the hub portion when molding (cooling) becomes more similar to the contraction in the flange portion. Therefore, it becomes possible to further control the partial contracting deformation of the hub, thereby making the diameter of the hub more uniform.

Meanwhile, it is desirable that the thickness in the radial direction of the resin layer 35 (thickness of a portion at a radially inner side of the reinforcing ring 48) D1 and a thickness in the radial direction of the cylindrical portion 34 (thickness of a portion at a radially outer side of the reinforcing ring 48) D2 are substantially the same (D1≈D2). Thereby, a diameter difference in the height direction of the reel hub 22 is effectively eliminated.

Also, although the connecting portion 35B is not provided to the reel 30 shown in FIG. 9A, it is desirable to provide the connecting portion 35B so that the diameter difference can be effectively eliminated. Next, the reel 30 shown in FIGS. 2 to 8 and FIG. 9B will be described.

Figure 9B:
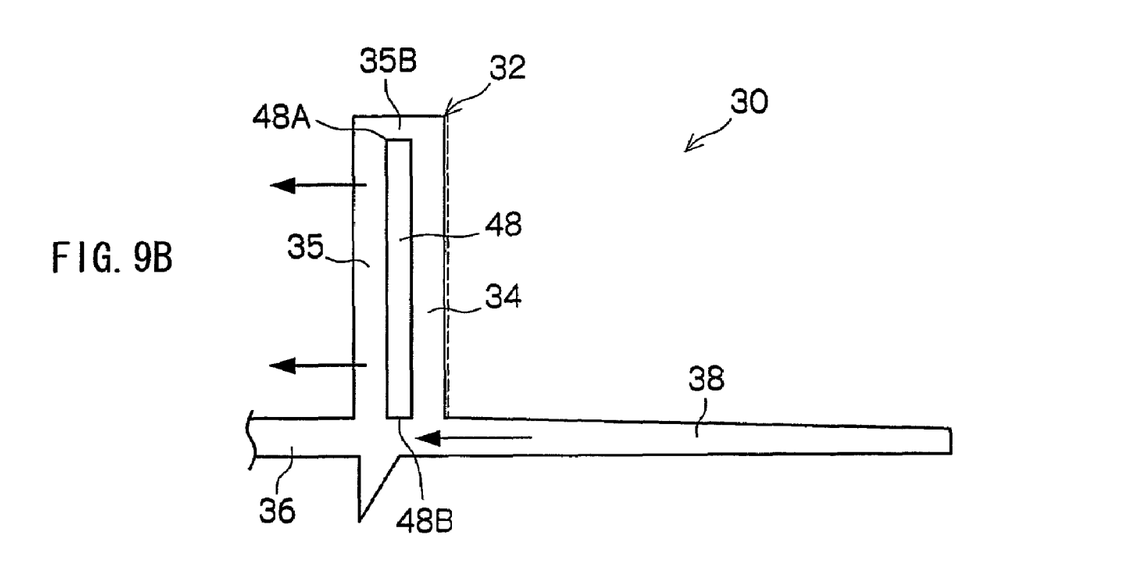
FIG. 9B is a schematic diagram illustrating an effect of the reel having the resin layer and a connecting portion for controlling contraction.

In this reel 30, the upper end portion of the resin layer 35 and the upper end portion of the cylindrical portion 34 (the inner peripheral surface side and the outer peripheral surface side of the reel hub 32 with the reinforcing ring 48 interposed therebetween) are integrally connected by the connecting portion 35B having a height (a thickness in the vertical direction) H of, for example, H=0.5 mm. When the resin layer 35 and the cylindrical portion 34 are thus integrally formed with the connection portion 35B, the contractions of both portions become linked, and the contraction of the reel hub 32 further increases (the complete reel hub 32 more uniformly contracts in the height direction).

Therefore, it is possible to make the contraction of the reel hub 32 (cylindrical portion 34 and the resin layer 35) further (more effectively) resemble the contraction of the lower flange 38, and further reduce the amount by which the diameter of the lower end portion of the cylindrical portion 34 of the reel hub 32 becomes smaller (contracts more) than the diameter of the other portions. That is to say, in this reel 30, since the reduction in the diameter of the outer peripheral surface of the lower end portion of the cylindrical portion 34 is further significantly controlled (for example, to about 5 µm per radius) as indicated by the broken line (exaggerated for clarity) in the drawings, it is possible to make the complete diameter of the reel hub 32 more uniform in the height direction.

Figure 10B:
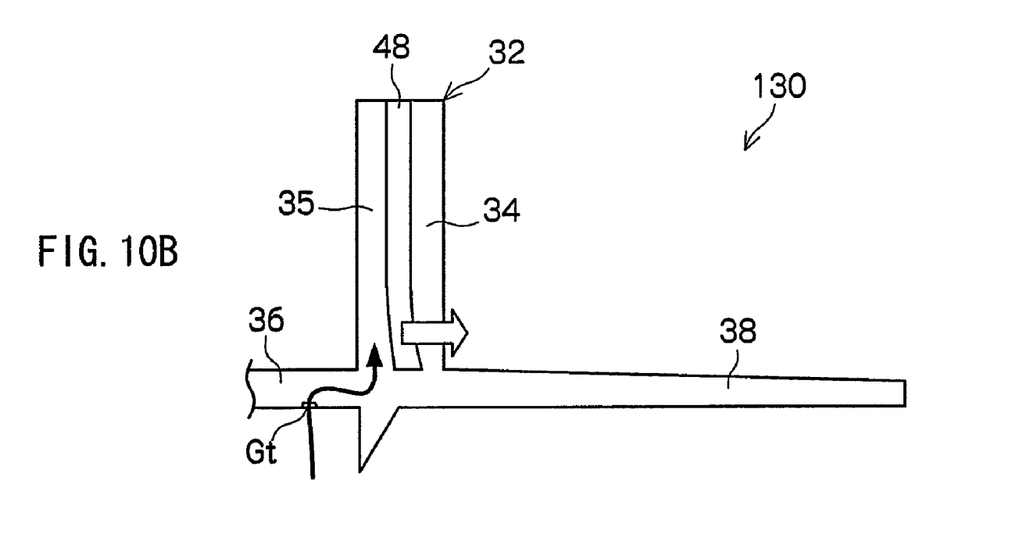
FIG. 10B is a schematic diagram illustrating deformation of a reinforcing ring due to a flow of the resin of the reel without a notch.

Further, according to the comparative example shown in FIG. 10B, although the resin layer 35 is disposed on the inner peripheral surface of the reinforcing ring 48 in the reel 130, the resin layer 35 is also disposed in the predetermined area E on the virtual extended line K, which connects the rotation center O of the reel 30 (reel hub 32) and the gate trace Gm. Therefore, when molding, the lower end portion 48B of the reinforcing ring 48 might be pushed in a radially outer direction by an inflow (flow) of resin material from the gate Gt (gate trace Gm) of the die, and thus the lower end portion 48B might be deformed in the radially outer direction.

On the other hand, in the reel 30 according to the exemplary embodiment, as described above (as shown in FIG. 8), the notch 35A is formed in the predetermined area (an area around the virtual extended line K in the center thereof) E on the virtual extended line K, which connects the rotation center O of the reel 30 (reel hub 32) and the gate trace Gm, and the resin layer 35 is not provided (the reinforcing ring 48 is exposed), so that when molding, the lower end portion 48B of the reinforcing ring 48 is not pushed in the radially outer direction by the inflow (flow) of the resin material from the gate Gt (gate trace Gm) of the die. Therefore, a problem that the lower end portion 48B deforms in the radially outer direction does not occur (deformation of the lower end portion 48B of the reinforcing ring 48 in the radially outer direction is prevented).

That is to say, since the resin layer is substantially not formed on the predetermined area on the extended line, which links the center of the hub and the gate trace formed by the inlet of the resin material that forms the hub, the resin material injected from the gate when molding and flowing in the radially outer direction does not push the tubular member in the radially outer direction. Therefore, the deformation of the tubular member in the radially outer direction is prevented.

Meanwhile, the reason why it is thus configured is that three gates Gt (gate traces Gm) are disposed on the reel gear 42 at predetermined intervals (at regular intervals). Accordingly, when the gates Gt (gate traces Gm) are disposed on the rotation center O of the reel 30 (reel hub 32) and is configured to position and hold the reinforcing ring 48 in the die in anther way, it is not required to provide notches 35A (it is not required to expose the reinforcing ring 48).

As described above, in the reel 30 according to the exemplary embodiment, since the resin layer 35 (which is integral with the cylindrical portion 34) is disposed on the inner peripheral surface of the reinforcing ring 48 such that the reinforcing ring 48 is embedded in the reel hub 32 except the notch 35A, the dimension accuracy of the winding area Ta (diameter of each portion in the height direction of the outer peripheral surface of the cylindrical portion 34) of the recording tape T in the reel hub 32 may be improved. That is to say, the dimension accuracy of the reel hub 32 may be improved in the reel 30 in which the reinforcing ring 48 is disposed on the reel hub 32 by the insert molding.

Meanwhile, although the example in which the invention is applied to the reel 30 in which lower flange 38 is formed integrally with the reel hub 32 has been described in the above-described example, the invention is not limited to this, and may be applied to the reel (not shown) in which the upper flange 40 is formed integrally with the reel hub 32. In fact, the invention is applicable to all the reels of another configure in which the diameter (outer diameter) of the reel hub 32 becomes nonuniform in the width direction (height direction) of the recording tape T due to a contraction unbalance of the resin material when injection molding.

Also, although it is configured that the recording tape cartridge 10 has the reader block 28 as the reader member, in the example, the invention is not limited to this, and may be configured such that a small cylindrical reader pin is attached on the tip end of the recording tape T as the reader member, for example, and further, configured to have a shielding member (such as a slide door, which moves along a predetermined straight line or a circular arc), which opens and closes the opening 18.

In addition, although the example in which the reel 30 is applied to the recording tape cartridge 10 is shown in the above-described example, the invention is not limited to this, and is applicable to a recording tape cassette (not shown) in which two reels for supplying and taking up are accommodated in the case, for example. In this case, it goes without saying that the invention may be applied at least one reel. Also, the invention is applicable to the take-up reel or the like of the drive device.

Further, although it has been configured that the recording tape T such as the magnetic tape is used in the example, the invention is not limited to this, and it is sufficient that the recording tape T is recognized as the information recording/playback media in a long tape shape, capable of recording the information and playing back the recorded information, and it goes without saying that the reel 30 according to the invention is applicable to the recording tape T of any recording/playback system.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A reel comprising:
   a resin hub including an outer peripheral surface on which a recording tape is wound; a first flange integrally formed at one end portion of the hub;
   a second flange welded at the other end portion of the hub; and
   a reinforcing tubular member disposed at an inner peripheral surface of the hub by insert molding;
   wherein, a resin layer extending in a height direction of the hub from the one end portion side of the hub at which the first flange is integrally formed is disposed on an inner peripheral surface of the tubular member;
   the reel further comprising a connecting portion, which connects the hub and the resin layer integrally, on the other end portion side of the hub at which the second flange is welded, wherein the hub and the resin layer form a closed space for accommodating the tubular member;
   wherein the resin layer is substantially not formed on a predetermined area on an extended line, which links a center of the hub and a gate trace formed by an inlet of a resin material that forms the hub; and
   wherein the hub includes a cylindrical portion including an outer periphery on which a recording tape is wound, and a bottom portion closing a lower portion of the cylindrical portion.

2. The reel of claim 1, wherein a height of the resin layer is equal to or higher than a height of the tubular member.

3. The reel of claim 1, wherein a thickness of the resin layer in a radial direction and a thickness of the cylindrical portion in the radial direction are substantially the same.

4. The reel of claim 1, wherein an annular reel gear which is coaxial with the reel is formed on a lower surface of the bottom portion of the hub, and
   gate traces made due to inlets of a resin material that forms the hub are formed on the reel gear at predetermined intervals.

5. The reel of claim 1, wherein the resin layer is formed integrally with the hub.

6. A reel comprising:
   a resin hub having a cylindrical portion including an outer peripheral surface on which a tape is wound, and a flange portion integrally formed at least one end portion of the hub;
   a reinforcing tubular member inserted into the cylindrical portion at an inner peripheral surface thereof;
   a resin layer formed on an inner peripheral surface of the tubular member integrally with the resin hub such that the tubular member is accommodated between the resin member and the hub; and
   a connecting portion, which connects the hub and the resin layer integrally, on the other end portion side of the hub at which the second flange is welded, wherein the hub and the resin layer form a closed space for accommodating the tubular member;
   wherein the hub includes a cylindrical portion including an outer periphery on which a recording tape is wound, and a bottom portion closing a lower portion of the cylindrical portion; and
   wherein a notch is formed at a predetermined area of the resin layer on an extended line, which links a center of the hub and a gate trace formed by an inlet of a resin material that forms the hub.

7. A reel on which a recording tape is wound, the reel comprising:
   a hub made of resin comprising an integrally formed first flange;
   a reinforcing tubular member comprising an outer surface, an inner surface, and two edges connecting the inner surface to the outer surface;
   wherein reinforcing tubular member is embedded in the hub such that the resin that makes the hub substantially surrounds the inner surface, the outer surface, and the two edges of the reinforcing tubular member;
   wherein the only portion of the hub that does not surround the reinforcing tubular member are notches, formed in the resin that cover the inner surface of the reinforcing member, such that the reinforcing tubular member is exposed along the notches; and
   wherein the notches are formed along a radial line that extends from a center of the hub through a location where an inlet for resin material is located on a mold.

* * * * *